(12) United States Patent
Dardis et al.

(10) Patent No.: US 11,288,124 B2
(45) Date of Patent: Mar. 29, 2022

(54) METHODS AND APPARATUS FOR IN-FIELD MITIGATION OF FIRMWARE FAILURES

(71) Applicant: Intel Corporation, Santa Clara, CA (US)

(72) Inventors: Sean Dardis, Hillsboro, OR (US); Karunakara Kotary, Portland, OR (US); Michael Kubacki, Hillsboro, OR (US); Ankit Sinha, Hillsboro, OR (US)

(73) Assignee: Intel corporation, Santa Clara, CA (US)

( * ) Notice: Subject to any disclaimer, the term of this patent is extended or adjusted under 35 U.S.C. 154(b) by 190 days.

(21) Appl. No.: 16/370,962

(22) Filed: Mar. 30, 2019

(65) Prior Publication Data

US 2019/0227876 A1    Jul. 25, 2019

(51) Int. Cl.
*G06F 11/14* (2006.01)
*G06F 8/65* (2018.01)
(Continued)

(52) U.S. Cl.
CPC ............ *G06F 11/1433* (2013.01); *G06F 8/65* (2013.01); *G06F 8/71* (2013.01); *G06F 9/4401* (2013.01)

(58) Field of Classification Search
CPC ...... G06F 11/1433; G06F 8/65; G06F 9/4401; G06F 8/71
See application file for complete search history.

(56) References Cited

U.S. PATENT DOCUMENTS 7,827,154 B1 * 11/2010 Spertus ................. G06F 11/079
707/689
2006/0294353 A1 * 12/2006 Rothman ............ G06F 11/0766
713/1

(Continued)

FOREIGN PATENT DOCUMENTS

WO    20060127949    11/2006
WO    20090073969    6/2009

OTHER PUBLICATIONS

China National Intellectual Property Administration,"Notice on having passed the preliminary examination," issued in connection with Chinese Patent Application No. 202010150607.3, dated Apr. 10, 2020, 3 pages.

(Continued)

*Primary Examiner* — Bryce P Bonzo
*Assistant Examiner* — Michael Xu
(74) *Attorney, Agent, or Firm* — Hanley, Flight & Zimmerman, LLC; Michael J. Lenisa (57) ABSTRACT

Methods, apparatus, systems and articles of manufacture for mitigating a firmware failure are disclosed. An example apparatus includes at least one hardware processor and first memory including instructions to be executed by the at least one hardware processor. The example apparatus further includes mask memory including a feature mask associated with a first firmware version, the feature mask identifying features of the first firmware version to be disabled. A platform firmware controller is to apply the first firmware version to the first memory for execution by the at least one processor, initialize the at least one processor using the feature mask, and in response to a detection of a failure, determine a first de-feature mask based on a second de-feature mask previously used by the at least one processor (Continued)

and the feature update mask; and initialize the processor using the first de-feature mask.

20 Claims, 6 Drawing Sheets

(51) Int. Cl.
   *G06F 8/71*        (2018.01)
   *G06F 9/4401*      (2018.01)

(56) References Cited

U.S. PATENT DOCUMENTS

| | | | |
|---|---|---|---|
| 2010/0058323 A1* | 3/2010 | Shahidzadeh | G06F 21/57 717/173 |
| 2013/0227356 A1* | 8/2013 | Kim | G06F 11/0742 714/48 |
| 2014/0280815 A1* | 9/2014 | Candelaria | G06F 13/426 709/223 |
| 2016/0124753 A1* | 5/2016 | Tsirkin | G06F 9/45545 713/2 |
| 2017/0031671 A1* | 2/2017 | Joshi | G06F 8/654 |
| 2017/0109175 A1* | 4/2017 | Angaluri | G06F 9/441 |
| 2017/0199776 A1* | 7/2017 | Dasar | G06F 9/4401 |
| 2018/0004506 A1* | 1/2018 | Annapureddy | G06F 8/654 |
| 2018/0278587 A1* | 9/2018 | Daskalopoulos | H04L 63/0428 |
| 2019/0138431 A1* | 5/2019 | Holbrook | G06F 8/65 |
| 2020/0057629 A1* | 2/2020 | Samuel | G06F 8/654 |

OTHER PUBLICATIONS

Lichtenberg, "Common Firmware Enviroment (CFE) Functional Specification," [https://melbourne.wireless.org.au/files/wrt54/cfe.pdf], Jul. 30, 2004, 145 pages.

European Patent Office, "Extended European Search Report," issued in connection with European Patent Application No. 20161582.0, dated Sep. 8, 2020, 12 pages.

* cited by examiner

METHODS AND APPARATUS FOR IN-FIELD MITIGATION OF FIRMWARE FAILURES

FIELD OF THE DISCLOSURE

This disclosure relates generally to firmware updates, and, more particularly, to methods and apparatus for in-field mitigation of firmware failures.

BACKGROUND

Firmware is a type of computer software that enables control of device hardware. Firmware plays an ever-increasing role in the functionality, performance, and security of a system While firmware is typically developed and deployed (e.g., sold and/or provided) with hardware, in some cases, firmware may be updated to fix issues and/or provide new features. Firmware updates present a challenge to a computing device ecosystem.

BRIEF DESCRIPTION OF THE DRAWINGS

The figures are not to scale. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A firmware vendor, an original equipment manufacturer (OEM), and/or other firmware-providing entity provides firmware for use on computing devices. Generally, firmware is installed on such computing devices at a time of manufacture. However, in some scenarios, firmware is provided and/or installed while a device is operating in the field. Firmware updates can be provided to, for example, patch security vulnerabilities, provide new features, fix bugs, etc.

Unfortunately, it is impractical for a firmware-providing entity to validate all scenarios for their products in the field (e.g., to account for various auxiliary devices that may be connected to the computing device). As a result, firmware deployment failures can occur. Such failures can result in an updated device being inoperable and/or unrecoverable. As a result, a great deal of testing is performed prior to distribution of a firmware update to attempt to ensure that devices do not become inoperable. In some examples, a firmware update and/or distribution thereof is dependent upon other entities (e.g., an OEM for integration and/or distribution). Such dependencies on OEM partners make it difficult to provide firmware updates (which may include critical security fixes) in a timely fashion.

Examples disclosed herein reduce firmware deployment failures, as well as allow for particular features of a computing device to be enabled and/or disabled to allow for mitigation of security vulnerabilities. Example approaches disclosed herein utilize a secure de-feature mechanism that is exposed to firmware-providing entities. This allows mitigation of zero-day exploits with no firmware or software modification by remotely instructing pre-existing firmware provisioned on the computing device to de-feature (e.g., disable) the exploited feature. Moreover, examples disclosed herein utilize automated remediation in the field to perform secure firmware upgrades and/or secure firmware downgrades.

While examples disclosed herein are described in the context of a firmware-providing entity providing a firmware update to a computing device, such firmware update does not necessarily need to be a newer version of the firmware than has been previously distributed. That is, the firmware update may represent a roll-back to a prior firmware version (e.g., to mitigate effects of an intermediate firmware update that may present vulnerabilities).

Figure 1:
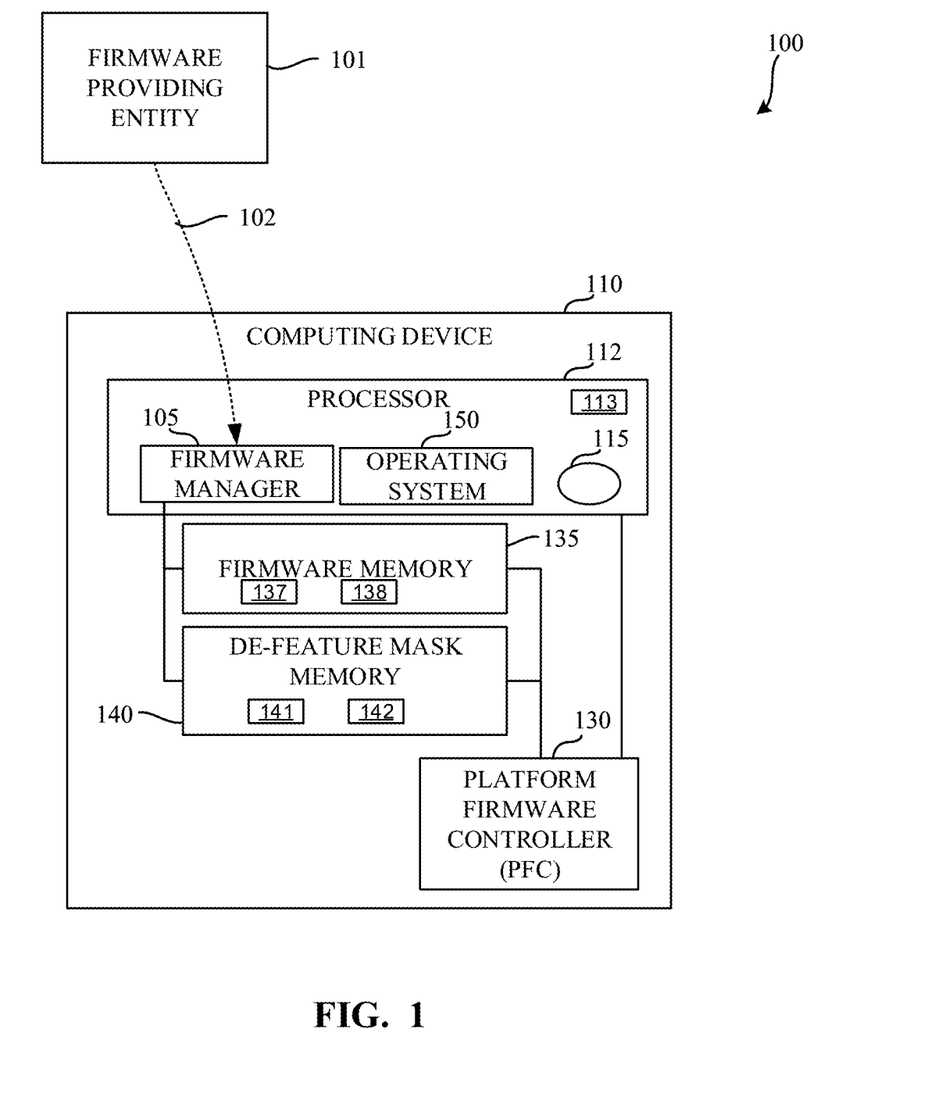
FIG. 1 is a block diagram of an example environment of use including a computing device implemented in accordance with the teachings of this disclosure.

FIG. 1 is a block diagram of an example environment of use 100 including an example computing device 110 implemented in accordance with the teachings of this disclosure. The example environment of use 100 includes a firmware-providing entity 101 that provides 102 a firmware update and/or a de-feature mask to a firmware manager 105 of the computing device 110. The example computing device 110 includes a processor 112 that implements the firmware manager 105 and executes firmware 115 provided by a platform firmware controller (PFC) 130. The example firmware manager 105 provides the firmware and/or de-feature mask (e.g., the firmware and/or de-feature mask received from the firmware-providing entity 101) to the platform firmware controller 130 via a firmware memory 135 and/or a de-feature mask memory 140. In some examples, the example processor 112 implements an operating system 150 and/or other applications.

The example firmware-providing entity 101 of the illustrated example of FIG. 1 is implemented by a server that provides firmware updates to the example computing device 110. In some examples, the firmware-providing entity 101 operates at the direction of a computer administrator (e.g., a remote administrator, an information technology personnel, etc.). In some examples, the firmware-providing entity 101 is operated by an operating system vendor and/or an original equipment manufacturer (OEM). However, any other party may operate the firmware-providing entity 101. In examples disclosed herein, the firmware-providing entity 101 provides firmware (e.g., a firmware update) and/or a de-feature mask to the computing device 110 via a network (e.g., the network 626 of FIG. 6) such as, for example, the Internet. In such an example, the firmware-providing entity 101 may implement a web server. However, firmware and/or de-feature masks may be provided 102 to the computing device 110 in any fashion such as, for example, via a physical computer-readable storage disk or storage device that is physically transported to the computing device (e.g., via postal mail).

The example computing device 110 of the illustrated example of FIG. 1 may be implemented by any type of computing device. In examples disclosed herein, the computing device is a desktop computer. However, any other computing device form factor may additionally or alternatively be used such as, for example, a mobile device, a server computer, an embedded computing device, an Internet of Things (IoT) computing device, etc.

In the illustrated example of FIG. 1, the example computing device includes the example processor 112. The example processor 112 of the illustrated example of FIG. 1 is implemented by a hardware processor. However, any other circuitry may additionally or alternatively be used such as, for example, analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable logic device(s) (FPLD(s)), etc.

The example firmware manager 105 of the illustrated example of FIG. 1 is implemented by the processor 112 of FIG. 1. However, any other type of circuitry may additionally or alternatively be used such as, for example, analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable logic device(s) (FPLD(s)), etc. The example firmware manager 105 communicates with the firmware-providing entity 101 to determine whether a new de-feature mask and/or a new firmware update is available. In examples disclosed herein, the firmware manager 105 determines that the new de-feature mask is available in response to an indication from the firmware-providing entity 101 that a new de-feature mask is available. In some examples, the firmware manager 105 may periodically and/or a-periodically contact the example firmware-providing entity 101 to determine if a new de-feature mask is available. In some other examples, the firmware-providing entity 101 transmits an unsolicited notification (e.g., a push message) to the firmware manager 105 to alert the firmware manager 105 to the presence of an updated (e.g., new) de-feature mask. Alerting or otherwise informing the firmware manager 105 that a new de-feature mask is available enables the firmware-providing entity 101 to disable features in firmware that may cause vulnerabilities (e.g., to mitigate zero-day vulnerabilities). Moreover, the firmware-providing entity 101 can provide instructions (e.g., a de-feature mask) that disable a feature in the firmware.

If the example firmware manager 105 determines that a new de-feature mask is available, the example firmware manager 105 stores the de-feature mask in the de-feature mask memory 140. In examples disclosed herein, the de-feature mask is stored in the de-feature mask memory 140 in an authenticated fashion. That is, additional security primitives may be applied to the de-feature mask including confidentiality, integrity, replay protection, etc. to ensure the mask is not visible, modifiable, and/or open to replay attack from other system components. In examples disclosed herein, the firmware manager 105 stores the de-feature mask in a first location 141 of the de-feature mask memory 140, and a prior de-feature mask in a second location 142 of the de-feature mask memory 140. Thus, in the event of a failure, the de-feature mask (e.g., which, may have been updated to enable a particular feature) may be logically combined (e.g., OR'ed) with a prior de-feature mask to again disable a recently enabled feature.

Likewise, if the example firmware manager 105 determines that a new firmware update is available, the example firmware manager 105 stores the firmware update in the firmware memory 135. In examples disclosed herein, the firmware update is stored in the firmware memory 135 in an authenticated fashion, thereby ensuring that the firmware update is not visible, modifiable, and/or open to replay attack from other system components. In examples disclosed herein, the firmware manager 105 stores the firmware update a first location 137 of the firmware memory 135, and stores a prior version of the firmware (e.g., a rollback version of the firmware, a recovery version of the firmware) in a second location 138 of the firmware memory 135. Thus, in the event of a failure, the firmware update can be rolled back to a prior version of the firmware.

In some examples, the secure communication of the firmware update and/or de-feature mask is implemented between the firmware manager 105 (and/or the operating system 150) and the PFC 130 using a Unified Extensible Firmware Interface (UEFI) Authenticated Variable mechanism as defined in the UEFI specification and implemented in the open source Extensible Firmware Interface (EFI) Development Kit II (EDKII). For example, using authenticated UEFI variables, any UEFI Runtime Service caller can read an authenticated UEFI variable, however, only the holder of a private key (public key is pre-enrolled in the firmware) (e.g., the firmware manager 105) can update the variable. In some examples, the authentication and storage of the firmware update is performed from within an isolated execution environment (e.g., an SMM) which is used to ensure secure management of the UEFI Secure Boot variables at OS runtime.

The example firmware 115 of the illustrated example of FIG. 1 represents instructions and/or information that enables control of device hardware. While firmware is typically developed and deployed (e.g., sold and/or provided) with such hardware, in some cases, firmware may be updated to fix issues and/or provide new features. Firmware updates present a challenge to a computing device ecosystem. As firmware plays an ever-increasing role in the functionality, performance, and security of a system, examples disclosed herein improve firmware deployment to update firmware in the field. In examples disclosed herein, the firmware 115 enables the processor 112 to perform hardware initialization and/or tests of primary system components (e.g., components required for system functionality). In examples disclosed herein, the firmware is stored in a non-volatile memory of and/or accessible to the processor 112 (e.g., the firmware memory 135). The example firmware 115 is loaded into the non-volatile memory by the PFC 130. In some examples, the firmware 115 enables the processor 112 to provide runtime services to a host operating system.

The example platform firmware controller (PFC) 130 of the illustrated example of FIG. 1 is implemented by a system-on-chip (SOC). However, any other type of circuitry may additionally or alternatively be used such as, for example, analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable logic device(s) (FPLD(s)), etc. In examples disclosed herein, the PFC 130, upon boot of the computing device 110 (e.g., prior to initialization of the firmware 115 at the processor 112), determines whether there is a firmware update to be applied. In examples disclosed herein, the presence of a firmware update to be applied is determined based on, for example, the presence of a firmware update in the firmware memory 135, the presence of a firmware update instruction (e.g., a flag indicating that an update is to be applied) in the firmware memory 135 (or any other memory), etc.

The example PFC 130 stores the current version of the firmware as a rollback version. As used herein, a current version of firmware is a firmware package or installation (e.g., firmware file(s)) that is installed/stored in a memory of the processor 112 (e.g., the local memory 613 of FIG. 6). In examples disclosed herein, the current firmware is moved to a location in the firmware memory 135 that is reserved for rollback and/or recovery firmware (e.g., the second firmware memory location 138). The example PFC 130 then applies a firmware update (e.g., the firmware update stored in the first location 137 of the firmware memory 135) by copying the firmware stored in the example firmware memory 135 to a memory of the processor 112.

The example PFC 130 then determines whether the update was successful. In examples disclosed herein, the example PFC 130 may determine whether the update was successful by reading the firmware 115 back from the processor 112 (e.g., from the local memory 613 of FIG. 6) to determine whether the firmware is a match for the firmware stored in the firmware memory 135. In some examples, other checks and/or validations may be used to determine whether the update was properly applied. For example, the PFC 130 may monitor an amount of time that has elapsed since the copying of the firmware was initiated. In such an example, the PFC 130 may determine that the firmware is not correctly applied if a threshold amount of time has elapsed (e.g., if the copying of the firmware takes longer than five minutes), as such a condition may indicate a failure to write the firmware to the processor 112.

If the example PFC 130 determines that the update was successful, the example PFC 130 performs hardware initialization of the processor 112 using the feature update mask stored in the example de-feature mask memory 140. If the example PFC 130 determines that the update was not successful (or if any other error is detected during booting of the computing device 110 after application of the firmware update), the example PFC 130 performs a firmware rollback to re-apply the rollback version of the firmware. During the rollback, the PFC 130 performs a logical-OR of the existing de-feature mask and the feature update mask. The result of the logical-OR operation is stored as the de-feature mask in the de-feature mask memory 140. In this manner, the PFC 130 disables features that may have been enabled in the most recent firmware update.

The example firmware memory 135 of the illustrated example of FIG. 1 is implemented by any memory, storage device and/or storage disc for storing data such as, for example, flash memory, magnetic media, optical media, etc. Furthermore, the data stored in the firmware memory 135 may be in any data format such as, for example, binary data, comma delimited data, tab delimited data, structured query language (SQL) structures, etc. While in the illustrated example the firmware memory 135 is illustrated as a single device, the example firmware memory 135 and/or any other data storage elements described herein may be implemented by any number and/or type(s) of memories. In the illustrated example of FIG. 1, the firmware memory 135 stores firmware including, for example, a firmware update provided to the firmware manager 105 by the firmware-providing entity 101. In some examples, the firmware memory 135 stores multiple versions of firmware including, for example, a recovery firmware version, a rollback firmware version, etc.

The example de-feature mask memory 140 of the illustrated example of FIG. 1 is implemented by any memory, storage device and/or storage disc for storing data such as, for example, flash memory, magnetic media, optical media, etc. In examples disclosed herein, the de-feature mask memory 140 is implemented using non-volatile storage to enable the de-feature mask to be stored across system resets and/or power loss. Furthermore, the data stored in the de-feature mask memory 140 may be in any data format such as, for example, binary data, comma delimited data, tab delimited data, structured query language (SQL) structures, etc. While in the illustrated example of FIG. 1, the de-feature mask memory 140 is illustrated as a single device, the example de-feature mask memory 140 and/or any other data storage elements described herein may be implemented by any number and/or type(s) of memories.

In the illustrated example of FIG. 1, the de-feature mask memory 140 stores the de-feature mask and/or the feature update mask. As defined herein the de-feature mask is a bit-mask with bits corresponding to an indication of whether a particular feature is to be enabled or disabled. Likewise, the feature update mask is also a bit mask with bits corresponding to an indication of whether a particular feature is to be enabled or disabled. In examples disclosed herein, a logical value of one (1) indicates that the corresponding feature is to be disabled, and a logical value of zero (0) indicates that the corresponding feature is to be enabled. Moreover, any other mask format may additionally or alternatively be used.

In examples disclosed herein, during system initialization, the de-feature mask (or the feature update mask) is used to determine which features are to be initialized. In examples disclosed herein, the de-feature mask and/or the feature update mask includes an industry standard section (corresponding to generic features) and, in some examples, includes one or more vendor-specific sections (corresponding to features specific to that vendor). In examples disclosed herein, the de-feature mask and the feature update mask are backwards compatible for a given system.

While in examples disclosed herein, the PFC 130 applies a firmware update to the processor 112 of the computing device 110, the PFC 130 may apply the firmware update to any other firmware-executing circuitry of the computing device 110 separate from the processor 112 such as, for example, a baseboard management controller (BMC). In some examples, the PFC 130 may apply the firmware update to firmware-executing circuitry of a device separate from the computing device 110.

While in the illustrated example of FIG. 2, the firmware manager 105 accesses and stores the updated firmware and/or de-feature mask for later access by the PFC 130, in some examples, the PFC 130 may be implemented by a baseband management controller (BMC) and/or any other computing circuitry (e.g., an Active Management Technology (AMT) circuit) that may communicate directly with the firmware-providing entity 101. In this manner, out-of-band remote management to enable/disable features of the computing device 110 (and/or provide firmware updates) may be achieved.

Figure 2:
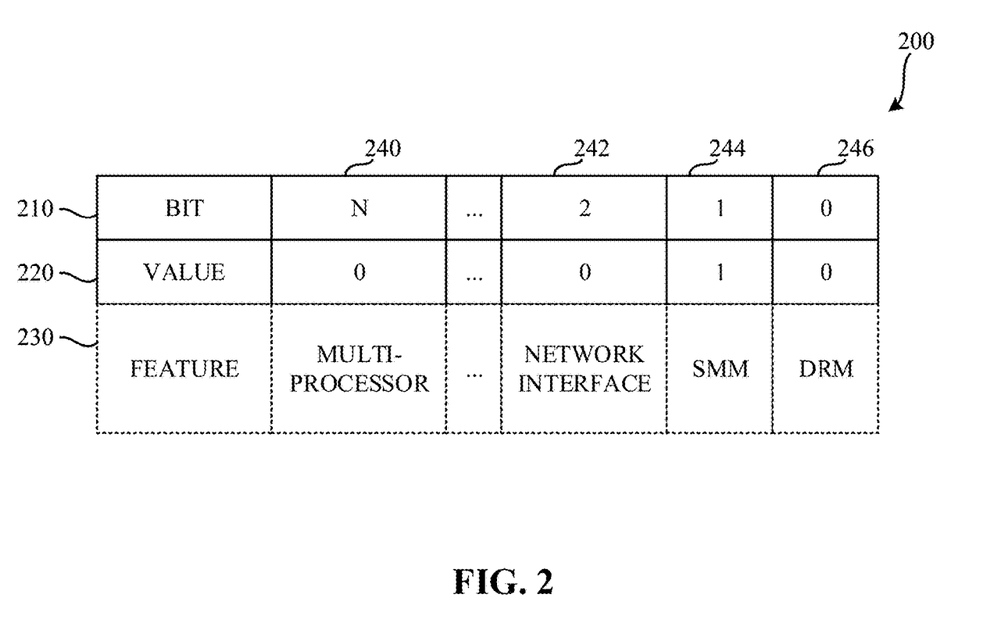
FIG. 2 is an example de-feature mask that may be used by the example platform firmware controller of FIG. 1 to enable/disable firmware features.

FIG. 2 is an example de-feature mask 200 that may be used by the example PFC 130 of FIG. 1 to enable/disable firmware features. The example de-feature mask 200 is represented as an array of bits, with each bit corresponding to a respective feature to be enabled (or disabled). The example de-feature mask 200 of FIG. 2 includes a row of bit identifiers 210, a row of values 220, and a row of corresponding features 230. In practice, the de-feature mask 200 may be represented using only the values (e.g., without labels describing the values). In the illustrated example of FIG. 2, an example first column 240, representing bit N having a value of zero, represents that the multi-processor feature is not to be disabled (e.g., the feature is to be enabled). An example second column 242, representing bit two having a value of zero, represents that the network interface feature is not to be disabled. An example third column 244 representing bit one having a value of one, indicates that the system management mode (SMM) feature is to be disabled. An example fourth column 246, representing bit zero having a value of zero, indicates that the digital rights management (DRM) feature is not to be disabled.

In the illustrated example of FIG. 2, the row of values 220 includes single bit representations of whether a feature is to be enabled or disabled. However, in some examples, multiple bits of information may be used to specify whether a feature is to be enabled/disabled, and/or limits on feature parameters (e.g., clock speeds, voltage levels, etc.). Moreover, while in the illustrated example of FIG. 2, the de-feature mask 200 is represented as an array of bits, any other data structure and/or data format may additionally or alternatively be used to represent the de-feature mask.

While in the illustrated example of FIG. 2, four features are represented by the de-feature mask 200, any number of features to be enabled/disabled may be represented by the de-feature mask 200. Such features will vary by platform. Such features may include, for example, a limit on core usage, a limit on hyperthreading, a limit on execution speed, limits on network connectivity, limits on peripheral usage (e.g., device exposure and/or operation), limits on system power state exposure, limits on hardware feature availability and/or functionality, limits on software feature availability and/or functionality, limits on system management mode (SMM) functionality, limits on system up time, etc.

In examples disclosed herein, the presence of a feature in the de-feature mask 200 indicates that the computing device is capable of operating with or without the feature enabled. That is, while the implementation of features exposed by the de-feature mask 200 may vary by platform, in order to maintain a working system, critical system resources are not allowed to be fully disabled. Such an approach ensures and/or increases the likelihood that the device is able to exit the de-featured state (e.g., at a later time when a new firmware update is provided). Example resources that might be considered critical system resources are, for example, at least a single core to execute instructions, main memory that firmware and/or an operating system can access, a graphical user interface, a power connection, a display driver, a user input device, etc.

While an example manner of implementing the computing device 110 is illustrated in FIG. 1, one or more of the elements, processes and/or devices illustrated in FIG. 1 may be combined, divided, re-arranged, omitted, eliminated and/or implemented in any other way. Further, the example firmware manager 105, the example platform firmware controller 130, and/or, more generally, the example computing device 110 of FIG. 1 may be implemented by hardware, software, firmware and/or any combination of hardware, software and/or firmware. Thus, for example, any of the example firmware manager 105, the example platform firmware controller 130, and/or, more generally, the example computing device 110 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example firmware manager 105, the example platform firmware controller 130, and/or, more generally, the example computing device 110 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computing device 110 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
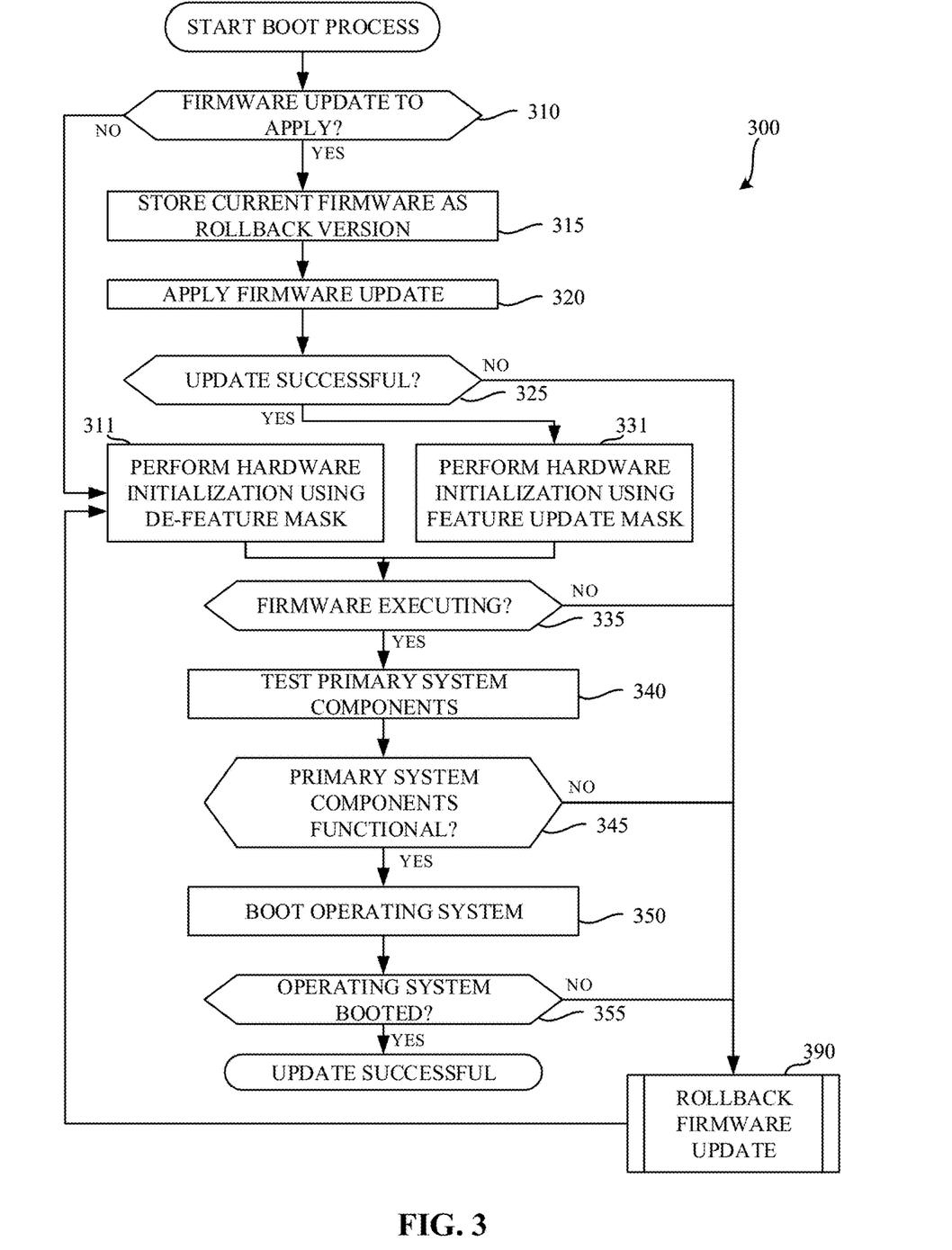
FIG. 3 is a flowchart representative of machine readable instructions which may be executed to boot the computing device of FIG. 1.
Figure 4:
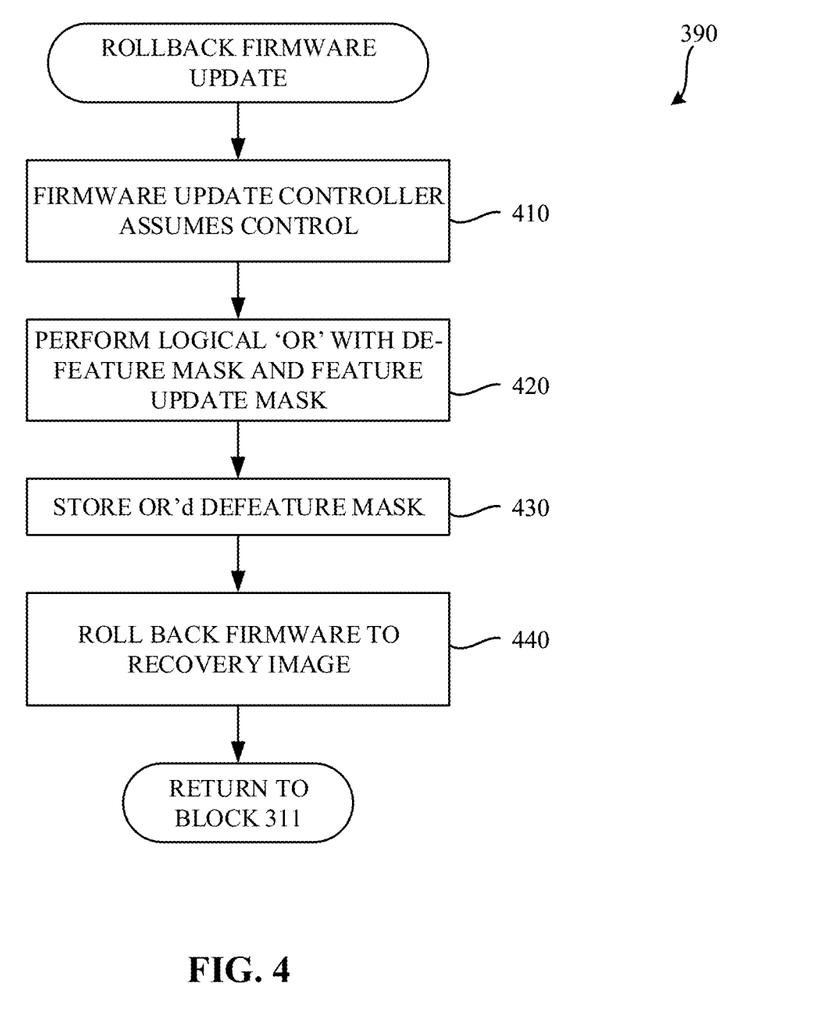
FIG. 4 is a flowchart representative of machine readable instructions which may be executed to rollback a firmware update previously applied to the computing device of FIG. 1.

Flowcharts representative of example hardware logic, machine readable instructions, hardware implemented state machines, and/or any combination thereof for implementing the computing device 110 of FIG. 1 are shown in FIGS. 3, 4, and/or 5. The machine readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3, 4, and/or 5, many other methods of implementing the example computing device 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 3, 4, and/or 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 3 is a flowchart representative of machine readable instructions which may be executed to boot the computing device 110 of FIG. 1. The example process 300 of the illustrated example of FIG. 3 begins when the example PFC 130 determines whether there is a firmware update to be applied. (Block 310). In examples disclosed herein, the presence of a firmware update to be applied is determined based on, for example, the presence of a firmware update in the firmware memory 135, the presence of a firmware update instruction (e.g., a flag indicating that an update is to be applied) in the firmware memory 135 (or any other memory), etc. If there is no firmware update to be applied (e.g., block 310 returns a result of NO), the PFC 130 performs hardware initialization using the de-feature mask stored in the de-feature mask memory 140. (Block 311). In some examples, the de-feature mask may be updated independently of the firmware.

If there is a firmware update to be applied (e.g., block 310 returns a result of YES), the example PFC 130 stores the current version of the firmware as a rollback version. (Block 315). In the illustrated example of FIG. 3, the current firmware is moved to a location in the firmware memory 135 that is reserved for rollback and/or recovery firmware (e.g., the second firmware memory location 138).

The example PFC 130 then applies a firmware update (e.g., the firmware update stored in the firmware memory) by copying the firmware stored in the example firmware memory 135 to a memory of the processor 112. (Block 320). The example PFC 130 then determines whether the update was successful. (Block 325). In examples disclosed herein, the example PFC 130 may determine whether the update was successful by reading the firmware back from the processor 112 to determine whether the firmware is a match for the firmware stored in the firmware memory 135. In some examples, other checks and/or validations may be used to determine whether the update was properly applied. For example, the PFC 130 may monitor an amount of time that has elapsed since the copying of the firmware was initiated. In such an example, the PFC 130 may determine that the firmware is not correctly applied if a threshold amount of time has elapsed (e.g., if the copying of the firmware takes longer than five minutes), as such a condition may indicate a failure to write the firmware to the processor 112.

If the example PFC 130 determines that the update was successful (e.g., block 325 returns result of YES), the example PFC 130 performs hardware initialization using the feature update mask stored in the example de-feature mask memory 140. (Block 331). If the example PFC 130 determines that the update was not successful (e.g., block 325 returns a result of NO) the example PFC 130 performs a firmware rollback. (Block 390). An example process for performing the rollback is described below in connection with FIG. 4.

After initializing the hardware (block 311 or block 331), the processor 112, using the firmware 115, determines whether the firmware is executing. (Block 335). If the firmware is not executing (e.g., block 335 returns a result of NO) the example PFC 130 performs the firmware rollback. (Block 390). In some examples, the PFC 130 additionally monitors to determine whether the firmware is executing at block 335. Such an approach ensures that if the processor 112 does not begin executing the firmware, the rollback procedure of block 390 can be initiated.

If the example processor 112 and/or the PFC 130 determines that the firmware is executing (e.g. block 335 returns a result of YES), the example processor 112 using the firmware 115 tests one or more primary system components. (Block 340). Primary system components may include, for example, power supplies, processing units, memory, etc. The example processor 112, using the firmware 115, determines whether the one or more primary system component(s) are functional. (Block 345). If the example processor 112 determines that one of the one or more primary system components is not functional (e.g., block 345 returns a result of NO in connection with any of the primary system components), the example PFC 130 performs the firmware rollback. (Block 390).

If all of the one or more primary system components are functional (e.g., block 345 returns result of YES), the example processor 112, using the firmware 115, boots the operating system 150. (Block 350). The example processor 112 determines whether the operating system 150 is booted within a threshold amount of time. (Block 335). In some examples, the threshold amount of time is five minutes. However, any other threshold may additionally or alternatively be used. In some examples, the firmware manager 105, operated by the processor 112, determines whether the operating system 150 has been booted within the threshold amount of time at block 355. If the operating system 150 has booted (e.g., block 355 returns result of YES), the firmware update is considered successful and operation of the computing device 110 proceeds. However, if the operating system 150 is not booted within the threshold period of time (e.g. block 355 returns result of NO) control is passed to the PFC 130 where the firmware update is rolled back. (Block 390).

In the illustrated example of FIG. 3, the determinations performed at blocks 325, 335, 345, and/or 355 represent checkpoints that are used to, for example, identify a problem with deploying and/or updating firmware. In the illustrated example of FIG. 3, numerous checkpoints and/or validations are used to implement a secure and automated rollback of firmware if a severe impact to stability is encountered (e.g. a Windows B SOD, a failure to boot, a failure to apply firmware, etc.). In the event of a rollback, a vulnerable feature can be disabled using the de-feature mask 200 described in FIG. 2. Thus, until a new firmware update is deployed, such features can remain disabled to prevent any vulnerabilities that may be associated with those features.

FIG. 4 is a flowchart representative of machine readable instructions which may be executed to rollback a firmware update previously applied to the computing device of FIG. 1. The example process 390 of the illustrated example of FIG. 4 begins when at least one of the PFC 130, the processor 112, or the firmware manager 105 determine that a firmware rollback is to be performed. To initiate the rollback, the example PFC 130 assumes control of the computing device 110. (Block 410). The example PFC 130 performs a logical-OR with the existing de-feature mask and a feature update mask. (Block 420). In this manner, features that may have been enabled in the most recent firmware update are disabled. However, any other approach to disabling features that were enabled in a prior update may additionally or alternatively be used. The example PFC 130 then stores the OR'ed de-feature mask in the de-feature mask memory 140 as the existing de-feature mask 142. (Block 430). The example PFC 130 then rolls back the firmware to the recovery image (e.g., stored in the first location 137 of the firmware memory 135). (Block 440). In some examples, the rollback to the recovery version is not performed (e.g., the updated firmware is left as-is at the processor 112). In this manner, the new and/or updated firmware remains at the processor 112 but, on a subsequent boot of the computing device 110, has any features identified as enabled in that firmware update disabled. Control then proceeds to block 331 of FIG. 3, where the example PFC 130 performs hardware initialization using the recently stored de-feature mask the from block 430.

Figure 5:
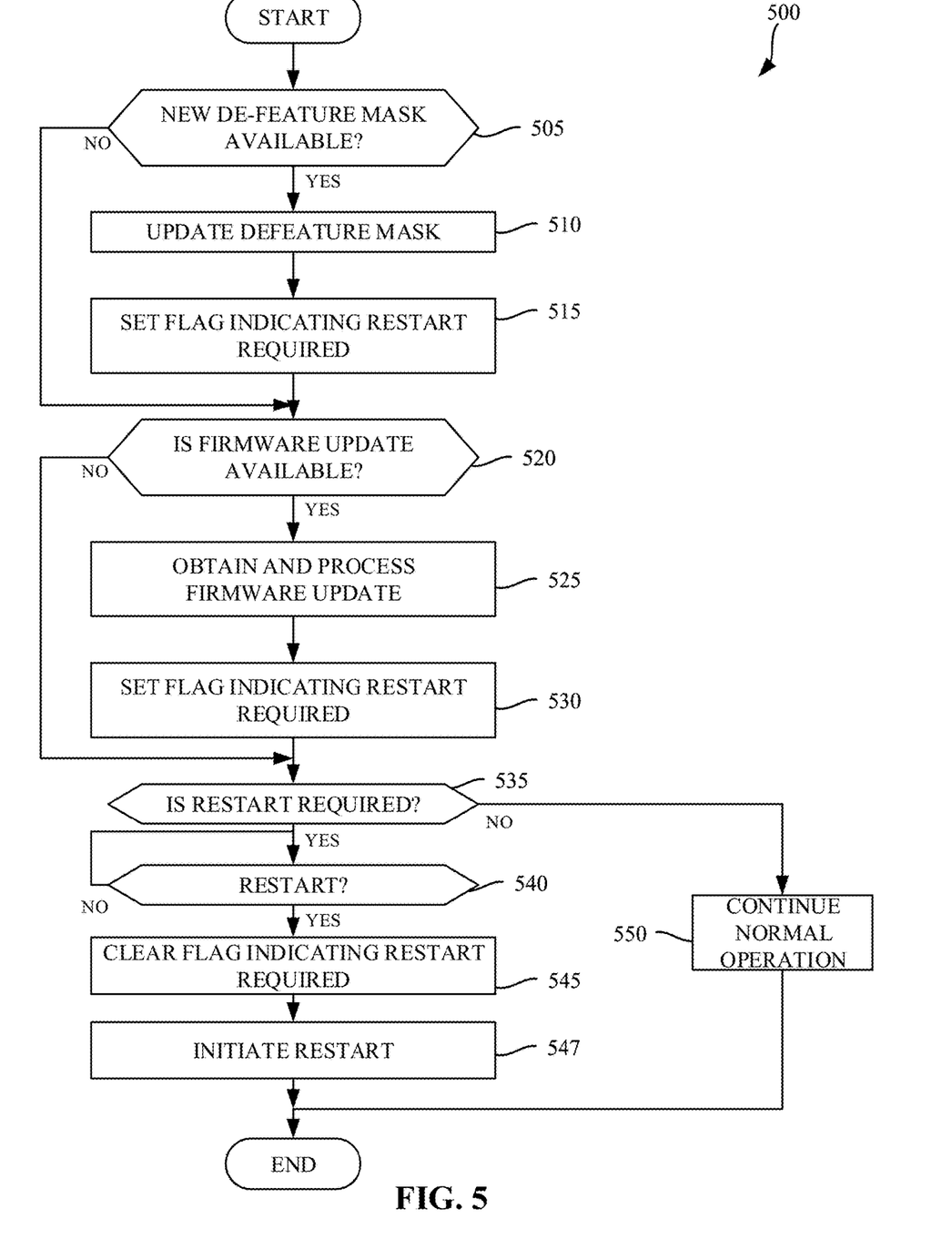
FIG. 5 is a flowchart representative of machine readable instructions which may be executed to trigger an update of the firmware of the computing device of FIG. 1.

FIG. 5 is a flowchart representative of machine readable instructions 500 which may be executed to trigger an update of the firmware of the computing device 110 of FIG. 1. The example process 500 of the illustrated example FIG. 5 begins when the example firmware manager 105 determines whether a new de-feature mask is available. (Block 505). In examples disclosed herein, the firmware manager 105 determines that the new de-feature mask is available in response to an indication from the firmware-providing entity 101 that a new de-feature mask is available. In some examples, the firmware manager 105 may contact the example firmware-providing entity 101 to determine if a new de-feature mask is available. In some other examples, the firmware-providing entity 101 transmits an unsolicited notification (e.g., a push message) to the firmware manager 105 to alert the firmware manager 105 to the presence of an updated (e.g., new) de-feature mask. Alerting or otherwise informing the firmware manager 105 that a new de-feature mask is available enables the firmware-providing entity 101 to disable features in firmware that may cause vulnerabilities (e.g., to mitigate zero-day vulnerabilities). Moreover, the firmware-providing entity 101 can provide instructions (e.g., a de-feature mask) that disable a feature in the firmware.

If a new de-feature mask is available (e.g., block 505 returns a result of YES), the example firmware manager 105 stores the de-feature mask in the de-feature mask memory. (Block 510). In some examples the de-feature mask represents a firmware update mask, and is associated with a firmware update. In such an example, the firmware update mask represents features that are to be enabled after a firmware update is applied. Conversely, in some examples, the de-feature mask may be provided separately from a firmware update and may be used to indicate features that are to be disabled (e.g., features that have been identified to introduce a security vulnerability).

In examples disclosed herein, the de-feature mask is stored in the de-feature mask memory 140 in an authenticated fashion. In some examples, additional security primitives may be applied to the de-feature mask including confidentiality, integrity, replay protection, etc. to ensure the mask is not visible, modifiable, and/or open to replay attack from other system components. In some examples, such secure communication of the firmware update and/or de-feature mask is implemented between the firmware manager 105 (and/or the operating system 150) and the PFC 130 using a Unified Extensible Firmware Interface (UEFI)

Authenticated Variable mechanism as defined in the UEFI specification and implemented in the open source Extensible Firmware Interface (EFI) Development Kit II (EDKII). For example, using authenticated UEFI variables, any UEFI Runtime Service caller can read an authenticated UEFI variable, however, only the holder of a private key (public key is pre-enrolled in the firmware) (e.g., the firmware manager 105) can update the variable. In some examples, the authentication and storage of the firmware update is performed from within an isolated execution environment (e.g., an SMM) which is used to ensure secure management of the UEFI Secure Boot variables at OS runtime.

In some examples, authenticated communication between the host operating system and UEFI firmware may be utilized. While this mechanism is most often used to update firmware images, such an approach can be used to pass data from the operating system 150 to the UEFI firmware for consumption on the following boot in a similar manner to the Authenticated UEFI variable mechanism. In some examples, other approaches for providing firmware updates and/or instructions to a computing device may additionally or alternatively be used.

In some examples, only particular firmware-providing entities (e.g., an Operating System vendor, an OEM, a system administrator, etc.) are allowed to make updates to the de-feature mask and/or the firmware. In such an example, the firmware manager 105 authenticates the entity providing the update to the de-feature mask and/or firmware. On the next boot, such changes take effect. In such examples, the firmware-providing entity 101 may provide an instruction to cause the computing device to restart (e.g., to ensure that the change take effect in a timely fashion).

The example firmware manager 105 then sets a flag 113 indicating that a restart is required. (Block 515). Upon setting the flag 113 and/or in the event that there is no new de-feature mask (e.g., block 505 returns a result of NO), the firmware manager 105 determines whether a new firmware update is available. (Block 520). In some examples, the firmware manager 105 contacts the example firmware-providing entity 101 to determine whether a firmware update is available. In some other examples, the firmware-providing entity 101 transmits an unsolicited notification (e.g., a push message) to the firmware manager 105 to alert the firmware manager 105 to the presence of the firmware update. Alerting and/or otherwise informing the firmware manager 105 that the firmware update is available enables the firmware-providing entity 101 to provide a firmware update to the computing device 110.

If a firmware update is available (e.g., block 520 returns a result of YES), the example firmware manager 105 stores the firmware update in the firmware memory 135. (Block 525). The example firmware manager 105 then sets the flag 113 indicating that a restart is required. (Block 530).

Upon setting the flag 113 at block 530, and/or in response to determining that no firmware update is available (e.g., block 520 returns a result of NO), the example firmware manager 105 determines whether a restart is required. (Block 535). In the illustrated example of FIG. 5, the determination of whether a restart is required is based on whether the flag 113 has been set to indicate that a restart is required. If a restart is required (e.g., block 535 returns a result of YES), the example firmware manager 105 determines whether a restart should be performed. (Block 540). In some examples, the firmware manager 105 interacts with the processor 112 to wait for another processes to terminate, to wait until a user has agreed to the restart, etc.

Upon determining that the restart should be executed (e.g., block 540 returns a result of YES), the example firmware manager 105 clears the flag 113 that indicates that a restart is required. (Block 545). The example firmware manager 105 then initiates a restart of the computing device 110. (Block 547). The restart enables the PFC 130, upon a subsequent boot, to apply a firmware update and/or disable features in an existing firmware, as described in connection with FIG. 3. Returning to block 535, if no restart is required, the example computing device 110 continues normal operation. (Block 550). The example process of FIG. 5 then terminates, but may be re-executed periodically (e.g., every hour, every day, etc.) and/or a-periodically (e.g., upon a subsequent initialization of the operating system 150, in response to a message from the firmware-providing entity 101, in response to a user request, etc.)

While in the illustrated example of FIG. 5, the receipt of the de-feature mask and the receipt of the firmware update package are represented as being performed in a serial fashion, receipt of such information may be performed in any order and/or may be performed in parallel. Importantly, updates to the firmware and updates to the de-feature mask may be provided independently of each other. Such an approach enables firmware providers (e.g., an OEM, an OS vendor, etc.) to mitigate zero-day exploits in a timely fashion.

Figure 6:
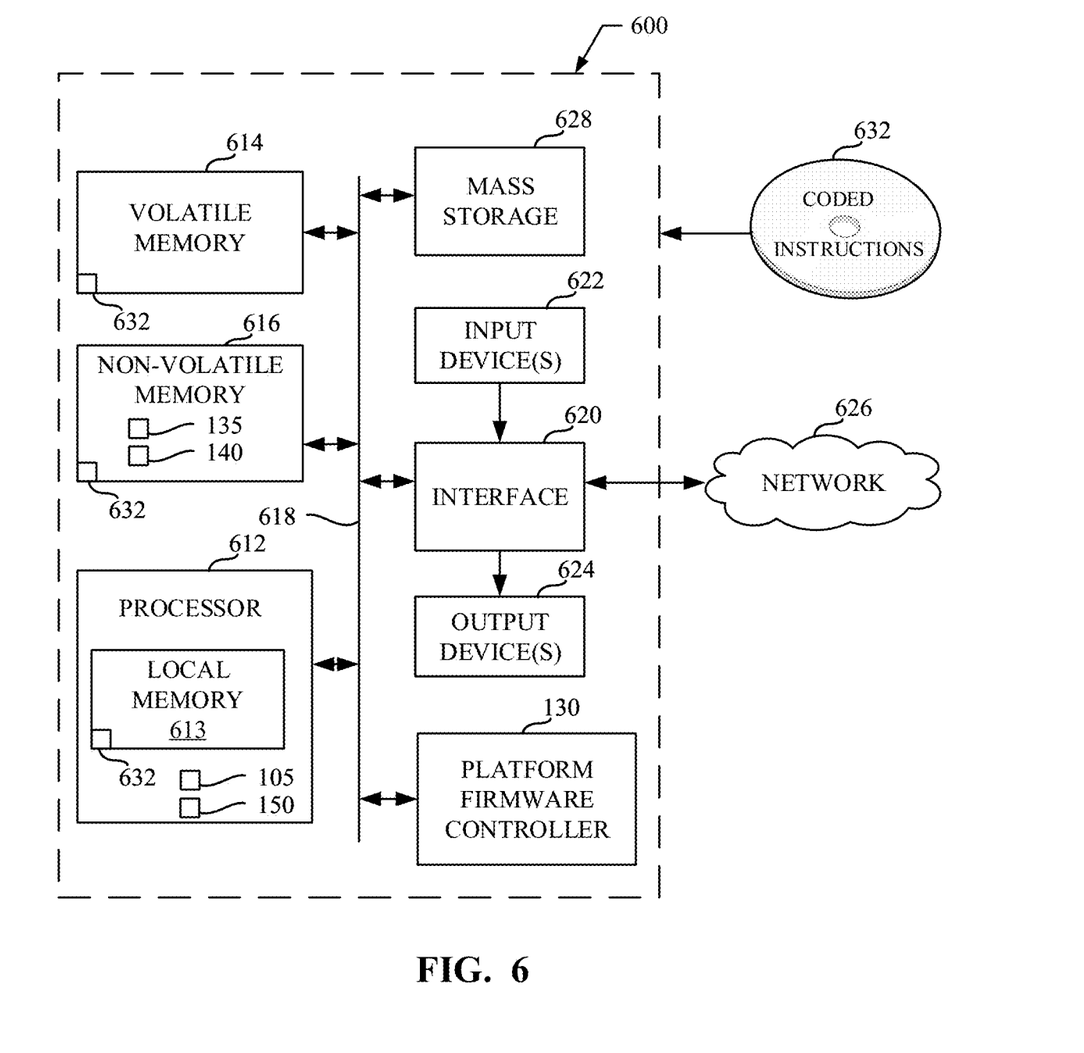
FIG. 6 is a block diagram of an example processing platform structured to execute the instructions of FIGS. 3, 4, and/or 5 to implement the example computing device of FIG. 1.

FIG. 6 is a block diagram of an example processor platform 600 structured to execute the instructions of FIGS. 3, 4, and/or 5 to implement the computing device 110 of FIG. 1. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example firmware manager 105 and/or the example operating system 150.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The example processor platform 600 includes the platform firmware controller (PFC) 130. The PFC 130 of the illustrated example of FIG. 6 is implemented by a system-on-chip (SOC). However, any other type of circuitry may additionally or alternatively be used such as, for example, analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable logic device(s) (FPLD(s)), etc. The PFC communicates with the firmware manager 105 via the non-volatile memory 616 and/or the bus 618 to apply firmware to the processor 612.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3, 4, and/or 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that enable rapid response to mitigate security vulnerabilities without the need for a software and/or firmware update, as well as reduces risk of a system becoming inoperable in the field due to an unstable and/or failed firmware update. For example, by allowing system components to disable (e.g., de-feature) features of the computing system, features may be disabled that are related to a discovered security vulnerability at the direction of a firmware-providing entity without the need to apply a new firmware to the computing device. The disclosed methods, apparatus and articles of manufacture improve the efficiency of using a computing device by not requiring lengthy firmware testing and/or validation cycles to be performed by a firmware-providing entity (or other entity associated with distribution of firmware). As a result, system vulnerabilities can be mitigated in a more efficient manner. The disclosed methods, apparatus and articles of manufacture are accordingly directed to one or more improvement(s) in the functioning of a computer.

Example methods, apparatus, systems, and articles of manufacture for mitigating a firmware failure are disclosed herein. Further examples and combinations thereof include the following:

Example 1 includes an apparatus to mitigate firmware failure, the apparatus comprising at least one hardware processor, first memory including instructions to be executed by the at least one hardware processor, mask memory including a feature mask associated with a first firmware version, the feature mask identifying features of the first firmware version to be disabled, and a platform firmware controller to apply the first firmware version to the first memory for execution by the at least one processor, initialize the at least one processor using the feature mask, in response to a detection of a failure determine a first de-feature mask based on a second de-feature mask previously used by the at least one processor and the feature update mask, and initialize the at least one processor using the first de-feature mask.

Example 2 includes the apparatus of example 1, wherein the platform firmware controller is further to determine the first de-feature mask by performing a logical-OR of the second de-feature mask and the feature update mask.

Example 3 includes the apparatus of example 2, wherein the first de-feature mask is to disable a feature of the at least one processor that was enabled via the feature mask.

Example 4 includes the apparatus of example 1, wherein the platform firmware controller is to apply a rollback version of the firmware to the at least one processor prior to the initialization of the at least one processor using the first de-feature mask.

Example 5 includes the apparatus of any one of examples 1-4, wherein the platform firmware controller is to further to access the first firmware version provided by a firmware-providing entity, the firmware-providing entity separate from the at least one processor.

Example 6 includes the apparatus of any one of examples 1-5, wherein the platform firmware controller is to detect the failure by determining whether the application of the first firmware version to the at least one processor was successful.

Example 7 includes the apparatus of any one of examples 1-5, wherein platform firmware controller is to detect the failure by determining if a primary system component is functional after the initialization of the at least one processor using the feature mask.

Example 8 includes the apparatus of any one of examples 1-5, wherein platform firmware controller is to detect the failure by determining if an operating system is booted within a threshold amount of time of the initialization of the at least one processor using the first feature mask.

Example 9 includes At least one non-transitory computer readable storage medium comprising instructions that, when executed by a platform firmware controller, cause the platform firmware controller to at least apply a first firmware version to a processor separate from the platform firmware controller, initialize the processor using a feature mask associated with the first firmware version, the feature mask identifying features of the first firmware version to be disabled, and in response to a detection of a failure determine a first de-feature mask based on a second de-feature mask previously used by the processor and the feature update mask, and initialize the processor using the first de-feature mask.

Example 10 includes the computer readable storage medium of example 9, wherein the instructions, when executed, cause the platform firmware controller to determine the first de-feature mask by performing a logical-OR of the second de-feature mask and the feature update mask.

Example 11 includes the computer readable storage medium of example 10, wherein the first de-feature mask is to disable a feature of the processor that was enabled via the feature mask.

Example 12 includes the computer readable storage medium of example 9, wherein the instructions, when executed, cause the platform firmware controller to initialize the processor using the first de-feature mask while executing the first firmware version.

Example 13 includes the computer readable storage medium of any one of examples 9-12, wherein the instructions, when executed, cause the platform firmware controller apply a rollback version of the firmware to the processor prior to initializing the processor using the first de-feature mask.

Example 14 includes the computer readable storage medium of any one of examples 9-13, wherein the instructions, when executed, cause the platform firmware controller to access the first firmware version provided by a firmware-providing entity, the firmware-providing entity separate from the processor.

Example 15 includes the computer readable storage medium of any one of examples 9-14, wherein the instructions, when executed, cause the platform firmware controller detect the failure by determining if the application of the first firmware version to the processor was successful.

Example 16 includes the computer readable storage medium of any one of examples 9-14, wherein the instructions, when executed, cause the platform firmware controller to detect the failure by determining if primary system components are functional after initializing the processor using the feature mask.

Example 17 includes the computer readable storage medium of any one of examples 9-14, wherein the instructions, when executed, cause the platform firmware controller to detect the failure by determining if an operating system is booted within a threshold amount of time of the initialization of the processor using the first feature mask.

Example 18 includes a method of mitigating a firmware failure, the method comprising applying a first firmware version to a processor, initializing the processor using a feature mask associated with the first firmware version, the feature mask identifying features of the first firmware version to be disabled, in response to a detection of a failure determining a first de-feature mask based on a second de-feature mask previously used by the processor and the feature update mask, and initializing the processor using the first de-feature mask.

Example 19 includes the method of example 18, wherein the determining of the first de-feature mask includes performing a logical-OR of the second de-feature mask and the feature update mask.

Example 20 includes the method of example 19, wherein the first de-feature mask is to disable a feature of the processor that was enabled via the feature mask.

Example 21 includes the method of any one of examples 18-20, wherein the initializing of the processor using the first de-feature mask is further performed using the first firmware version.

Example 22 includes the method of any one of examples 18-21, further including applying a rollback version of the firmware to the processor prior to initializing the processor using the first de-feature mask.

Example 23 includes the method of any one of examples 18-22, further including accessing the first firmware version provided by a firmware-providing entity, the firmware-providing entity separate from the processor.

Example 24 includes the method of any one of examples 18-23, further including detecting the failure by determining if the application of the first firmware version to the processor was successful.

Example 25 includes the method of any one of examples 18-23, further including detecting the failure by determining if primary system components are functional after initializing the processor using the feature mask.

Example 26 includes the method of any one of examples 18-23, further including detecting the failure by determining if an operating system is booted within a threshold amount of time of the initialization of the processor using the first feature mask.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to mitigate firmware failure, the apparatus comprising:
    at least one hardware processor;
    first memory including instructions to be executed by the at least one hardware processor;
    mask memory including a feature update mask associated with a first firmware version, the feature update mask identifying features of the first firmware version to be disabled; and
    a platform firmware controller to:
        apply the first firmware version to the first memory for execution by the at least one hardware processor;
        initialize the at least one hardware processor using the feature update mask;
        in response to a detection of a failure:
            determine a first de-feature mask based on a second de-feature mask previously used by the at least one hardware processor and the feature update mask, the feature update mask stored in a first location of the mask memory and the second de-feature mask stored in a second location of the mask memory, the first location of the mask memory separate from the second location of the mask memory; and
            initialize the at least one hardware processor using the first de-feature mask.

2. The apparatus of claim 1, wherein the platform firmware controller is further to determine the first de-feature mask by performing a logical-OR of the second de-feature mask and the feature update mask.

3. The apparatus of claim 2, wherein the first de-feature mask is to disable a feature that was enabled via the feature update mask.

4. The apparatus of claim 1, wherein the platform firmware controller is to apply a rollback version of the firmware for execution by the at least one hardware processor prior to the initialization of the at least one hardware processor using the first de-feature mask.

5. The apparatus of claim 1, wherein the platform firmware controller is to access the first firmware version provided by a firmware-providing entity, the firmware-providing entity separate from the at least one hardware processor.

6. The apparatus of claim 1, wherein the platform firmware controller is to detect the failure by determining whether the execution of the first firmware version by at least one hardware processor was successful.

7. The apparatus of claim 1, wherein the platform firmware controller is to detect the failure by determining if a primary system component is functional after the initialization of the at least one hardware processor using the feature update mask.

8. The apparatus of claim 1, wherein platform firmware controller is to detect the failure by determining if an operating system is booted within a threshold amount of time of the initialization of the at least one hardware processor using the feature update mask.

9. At least one non-transitory computer readable storage medium comprising instructions that, when executed by a platform firmware controller, cause the platform firmware controller to at least:
apply a first firmware version to a processor separate from the platform firmware controller;
initialize the processor using a feature update mask associated with the first firmware version, the feature update mask identifying features of the first firmware version to be disabled; and
in response to a detection of a failure:
determine a first de-feature mask based on a second de-feature mask previously used by the processor and the feature update mask, the feature update mask stored in a first location of a mask memory and the second de-feature mask stored in a second location of the mask memory, the first location of the mask memory separate from the second location of the mask memory; and
initialize the processor using the first de-feature mask.

10. The computer readable storage medium of claim 9, wherein the instructions, when executed, cause the platform firmware controller to determine the first de-feature mask by performing a logical-OR of the second de-feature mask and the feature update mask.

11. The computer readable storage medium of claim 10, wherein the first de-feature mask is to disable a feature of the processor that was enabled via the feature update mask.

12. The computer readable storage medium of claim 9, wherein the instructions, when executed, cause the platform firmware controller to initialize the processor using the first de-feature mask while executing the first firmware version.

13. The computer readable storage medium of claim 9, wherein the instructions, when executed, cause the platform firmware controller to apply a rollback version of the firmware for execution by the processor prior to initializing the processor using the first de-feature mask.

14. The computer readable storage medium of claim 9, wherein the instructions, when executed, cause the platform firmware controller to access the first firmware version provided by a firmware-providing entity, the firmware-providing entity separate from the processor.

15. The computer readable storage medium of claim 9, wherein the instructions, when executed, cause the platform firmware controller to detect the failure by determining if the application of the first firmware version to the processor was successful.

16. The computer readable storage medium of claim 9, wherein the instructions, when executed, cause the platform firmware controller to detect the failure by determining if primary system components are functional after initializing the processor using the feature update mask.

17. The computer readable storage medium of claim 9, wherein the instructions, when executed, cause the platform firmware controller to detect the failure by determining if an operating system is booted within a threshold amount of time of the initialization of the processor using the feature update mask.

18. A method of mitigating a firmware failure, the method comprising:
applying a first firmware version for execution by a processor;
initializing the processor using a feature update mask associated with the first firmware version, the feature update mask identifying features of the first firmware version to be disabled;
in response to a detection of a failure:
determining a first de-feature mask based on a second de-feature mask previously used by the processor and the feature update mask, the feature update mask stored in a first location of a mask memory and the second de-feature mask stored in a second location of the mask memory, the first location of the mask memory separate from the second location of the mask memory; and
initializing the processor using the first de-feature mask.

19. The method of claim 18, wherein the determining of the first de-feature mask includes performing a logical-OR of the second de-feature mask and the feature update mask.

20. The method of claim 19, wherein the first de-feature mask is to disable a feature that was enabled via the feature update mask.

* * * * *